United States Patent
Bhandarkar et al.

(10) Patent No.: US 6,209,357 B1
(45) Date of Patent: Apr. 3, 2001

(54) METHOD FOR FORMING ARTICLE USING SOL-GEL PROCESSING

(75) Inventors: Suhas Dattatreya Bhandarkar, Glen Gardner; Edwin Arthur Chandross, Murray Hill; Thomas Michael Putvinski, Scotch Plains, all of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/280,588

(22) Filed: Mar. 29, 1999

Related U.S. Application Data

(63) Continuation-in-part of application No. 09/120,016, filed on Jul. 21, 1998, now abandoned.

(51) Int. Cl.$^7$ .................................................. C03B 8/02
(52) U.S. Cl. ........................ 65/395; 65/17.2; 65/17.5; 264/621; 501/12
(58) Field of Search ........................ 65/17.2, 395, DIG. 8, 65/17.5; 501/12; 264/621

(56) References Cited

U.S. PATENT DOCUMENTS

| | | |
|---|---|---|
| 2,765,242 | 10/1956 | Alexander et al. . |
| 4,217,027 | 8/1980 | MacChesney et al. . |
| 4,262,035 | 4/1981 | Jaeger et al. . |
| 4,775,401 | 10/1988 | Fleming et al. . |
| 4,909,816 | 3/1990 | MacChesney et al. . |
| 5,240,488 | 8/1993 | Chandross et al. ............ 65/3.11 |
| 5,944,866 * | 8/1999 | Chen ................................ 65/395 |

FOREIGN PATENT DOCUMENTS

| | | |
|---|---|---|
| 0807610A | 11/1997 | (EP) . |
| 0905087A | 3/1999 | (EP) . |

OTHER PUBLICATIONS

Heath, D. et al. "Influence of pH, Electrolyte, and Poly(Vinyl Alcohol) Addition on the Rheological Behavior of Aqueous Silica (Aerosil) Dispersions" *Journal of Colloid and Interface Science*, vol. 93, No. 2, pp. 320–328 (1983).

Di,Marcello, F., "Fiber Drawing and Strength Properties", *Optical Fiber Communications*, vol. 1, Academic Press, Inc., pp. 179–248 (1995).

Scherer, G.W., "Stress and Fracture During Drying of Gels", *Journal of Non–Crystalline Solids*, 121, pp. 104–109 (1990).

Shoup, R.D., "Controlled Pore Silica Bodies Gelled from Silica Sol–Alkali Silicate Mixtures", Corning Glass Works, pp. 63–69.

* cited by examiner

Primary Examiner—James Derrington
(74) Attorney, Agent, or Firm—Scott J. Rittman

(57) ABSTRACT

A silica body useful for forming an optical fiber preform exhibits an ultimate strength of at least 20 MPa at 10 wt. % water loss. The body attains this strength, it is believed, by precipitation of silica at the contact sites of adjacent silica particles, thereby forming neck regions. The resultant network provides the strength to the gel body, such that the body is capable of being dried under more severe conditions than a gel body formed by previous sol-gel methods and is also more robust toward handling. The controlled precipitation is attained by inducing gelation and initiating drying at a pH of about 10.5 or higher, at which silica remains highly soluble. By gelling and drying at this pH level, the solubilized silica appears to precipitate in a controlled manner at the point of contact of adjacent silica particles, since such sites are the minimum free energy sites for precipitation.

14 Claims, 2 Drawing Sheets

METHOD FOR FORMING ARTICLE USING SOL-GEL PROCESSING

CROSS-REFERENCE TO RELATED APPLICATION

This application is a continuation-in-part of application Ser. No. 09/120,016, filed on Jul. 21, 1998, now abandoned.

BACKGROUND OF THE INVENTION

1. Field of the Invention

The invention relates to sol-gel processing methods.

2. Discussion of the Related Art

Optical fiber is produced from a glass preform, the preform typically consisting of a doped silica core surrounded by one or more claddings. As discussed in F. DiMarcello et al. "Fiber Drawing and Strength Properties," *Optical Fiber Communications*, Vol. 1, Academic Press, Inc., 1995, at 179–248, the disclosure of which is hereby incorporated by reference, the preform is generally arranged vertically in a draw tower such that a portion of the preform is lowered into a furnace region that typically heats the preform to temperatures around 2200° C. The portion of the preform placed into the furnace region begins to melt, and the lower end of the preform forms what is known as the neck-down region, which is where the preform glass flows from the original cross-sectional area of the preform to the desired cross-sectional area of the fiber. From the lower tip of this neck-down region, the optical fiber is drawn.

One approach to preform manufacture involves the fabrication of an overcladding that surrounds an inner cladding and core. The overcladding does not have to meet specifications as precise as the core and inner cladding, and efforts to speed manufacture of preforms have therefore often focused on less expensive methods of forming the overcladding. One manner of forming the overcladding is the use of a sol-gel process. However, sol-gel methods have in the past tended to encounter cracking during the overcladding tube formation and subsequent drying process. Methods that suppressed such tendency included, for example, the use of supercritical drying and/or the use of drying control chemical additives (DCCA), both of which are relatively expensive and laborious. Other sol-gel processes have involved the precipitation of silica particles from solution. However, such precipitation processes typically involved the use of alkali silicates, and thus required further processing steps to remove the alkali metal ions.

U.S. Pat. No. 5,240,488, the disclosure of which is hereby incorporated by reference, discloses a sol-gel process capable of producing crack-free overcladding preform tubes of a kilogram or larger. In this process, a colloidal silica dispersion, e.g., fumed silica, is obtained having a pH of 2 to 4. To obtain adequate stability of the dispersion and prevent agglomeration, the pH is raised to a value of about 10 to about 14 by use of a base. Typically, a commercially-obtained dispersion is pre-stabilized at such a pH value by addition of a base such as tetramethylammonium hydroxide (TMAH). Introduction of the TMAH raises the pH value. Other quaternary ammonium hydroxides behave similarly. When the pH is so raised, the silica takes on a negative surface charge due to ionization of silanol groups present on the surface, in accordance with the following reaction:

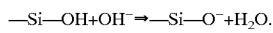

The negative charge of the silica particles creates mutual repulsion, preventing substantial agglomeration and maintaining the stability of the dispersion. In this state, the zeta potential of the particles is at a negative value. (Zeta potential is the potential across the diffuse layer of ions surrounding a charged colloidal particle, and is typically measured from electrophoretic mobilities—the rate at which colloidal particles travel between charged electrodes placed in a solution. See, e.g., C. J. Brinker and G. W. Scherer, *Sol-Gel Science*, Academic Press, 242–243.)

At a later stage in the process, as discussed in Col. 15, lines 39–65 of the '488 patent, a gelling agent such as methyl formate is added to reduce the pH. It is possible to use other esters, as well. The ester reacts to neutralize base, and the negative character of the silica particles is neutralized according to the following reaction:

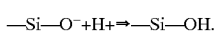

A sufficient amount of the ester must be introduced to neutralize the silica to a degree where gelation is induced. (Gelation, as used herein, indicates that the colloidal silica particles have formed a three-dimensional network with some interstitial liquid, such that the dispersion becomes essentially non-flowing, e.g., exhibiting solid-like behavior, at room temperature.)

Subsequent to gelation, the sol-gel body is typically released from its mold, and placed in an oven for drying and subsequent heat treatment, as reflected in the Table at Cols. 11–12 of the '488 patent. The gelled body is relatively weak and brittle, e.g., typically having an ultimate strength of no more than 0.5 MPa when released from a mold (ultimate strength measured by a conventional 3- or 4-point bending test). Because of the relative weakness of the sol-gel body, internal stresses induced by drying are capable of causing cracks in the body, as discussed in G. Scherer, "Stress and Fracture During Drying of Gels," *Journal of Non-Crystalline Solids*, Vol. 121, 1990, 104. To reduce the likelihood of cracking, sol-gel bodies are typically dried slowly, e.g., from several days to about two weeks at relatively low temperatures of 10 to 30° C. and relatively high humidity of at least 50%. Drying thus constitutes a substantial portion of the overall production time of a sol-gel body, often creating a bottle-neck in a production line. Moreover, the body must be handled gently upon release from the mold to prevent deformation and breakage, thereby complicating the overall fabrication process.

Improved sol-gel processes are therefore desired, in which stronger sol-gel bodies are formed and/or shorter drying times are possible.

SUMMARY OF THE INVENTION

In accordance with the invention, it is possible to fabricate a silica body, of at least 1 kg, by an improved sol-gel process. The sol-gel body is formed by providing a silica dispersion having at least 500 ppm of dissolved silica, inducing gelation of the dispersion at a pH of about 10.5 or greater, and drying the dispersion, such that the body exhibits a rapid increase in ultimate strength upon drying, e.g., a 50-fold increase over wet gel strength at 10 wt. % water loss. (Unlike the process of U.S. Pat. No. 5,240,488, the invention does not require use of glycerin or polymer additives such as polyethyloxazoline.) As reflected in FIGS. 2A to 2C, the body attains this strength, it appears, by precipitation of silica at the contact sites of adjacent silica particles 14, thereby forming neck regions 16. The network resulting from formation of numerous neck regions provides desirable strength, such that the gel body is capable of being dried under more severe conditions than a gel body formed by previous sol-gel methods and is also more robust toward handling. Specifically, the resultant body advantageously exhibits an ultimate strength of at least 20 MPa at 10 wt. % water loss, based on the weight of the wet (i.e., pre-dried) gel.

The mechanism for this strengthening generally requires that two conditions be met. The first condition is that at least the majority of the silica particle network, i.e., the gel network, be formed while silicate is still solubilized in the silica dispersion. Specifically, as illustrated in FIG. 1, at pH values above about 10.5, a silica dispersion typically contains a substantial amount of silica in solution phase (as a silicate, e.g., $(TMA)_2SiO_3$ where the stabilizing agent is TMAH), along with silica particles. This first condition therefore requires that gelation be initiated at a pH of about 10.5 or greater (i.e., the gel point is about 10.5 or greater). The gel point of a typical, stabilized silica dispersion is far below 10.5, however, and must be shifted. It is possible to attain this high-pH gelation in two ways. The first way is to stabilize a silica dispersion at a pH greater than 11, add a compound which shifts the isoelectric point (IEP) of the silica particles up to about 9.0 or greater such that the gel point is raised to about 10.5 or greater, and then add a gelation agent to drop the pH to the gel point to induce gelation. (The isoelectric point is the point on the pH scale where the zeta potential is zero, as discussed in C. J. Brinker and G. W. Scherer, *Sol-Gel Science*, supra. The gel point is typically about 1 to 2 pH units higher than the isoelectric point. Specifically, as the pH approaches the IEP, the zeta potential, and thus the mutual repulsion, of the particles diminishes to the point where ordinary thermal energy, i.e., Brownian motion, is able to break through the repulsive barrier such that gelation begins.) The second way to attain this high-pH gelation is to stabilize the dispersion at a pH greater than 11, and then add an alkali metal salt that screens (e.g., reduces) the double layer around individual silica particles, thereby inducing gelation. Where such a salt is used, the inorganic ions are subsequently removed to avoid devitrification. (The double layer is a diffuse aggregation of positive and negative electric charges surrounding a suspended colloidal particle, the aggregation rendering the particle essentially neutral. The added salt reduces the charge contained within the double layer and thereby reduces the neutrality, and thus the mutual repulsion, of the particles. See, e.g., R. J. Hunter, *Foundations of Colloid Science*, Oxford Science Publications, Vol. I, 1993.)

The second condition for the strengthening mechanism is that the solubilized silica be made to precipitate in a controlled manner. This condition is typically achieved in one of two ways. First, it is possible to initiate drying of the gel body at a pH of about 10.5 or greater such that the solubilized silicate becomes supersaturated and precipitates in a controlled manner primarily at the neck regions of adjacent particles, since these contact sites are the minimum free energy sites for precipitation. Second, it is possible to age the gel at a pH of about 10.5 or greater to induce ripening, which provides the same network formed from precipitation at contact sites of adjacent particles (FIG. 2C), but without the need for drying. Ripening is typically useful for relatively small silica particles, e.g., a surface area of 200 $m^2/g$ or greater. Gels of lower surface area, e.g., around 50 $m^2/g$, do not tend to exhibit this strengthening with aging alone. If gelation occurs below a pH of about 10.5, solubilized silicate will tend to precipitate onto silica particles before a substantial number of the particles come into contact with each other, and there would be an inadequate number of contact sites for the desired neck regions to form.

The process of the invention therefore uses an improved sol-gel process to form a silica body. Once a small amount of water is evaporated from the sol-gel body, the body is strong enough to endure a substantial increase in the drying temperature and be handled relatively easily. The overall drying time required is shortened and the process of handling the bodies eased, thereby improving a fiber manufacturing process when the silica body is incorporated into an optical fiber preform.

DETAILED DESCRIPTION OF THE INVENTION

Figure 1:
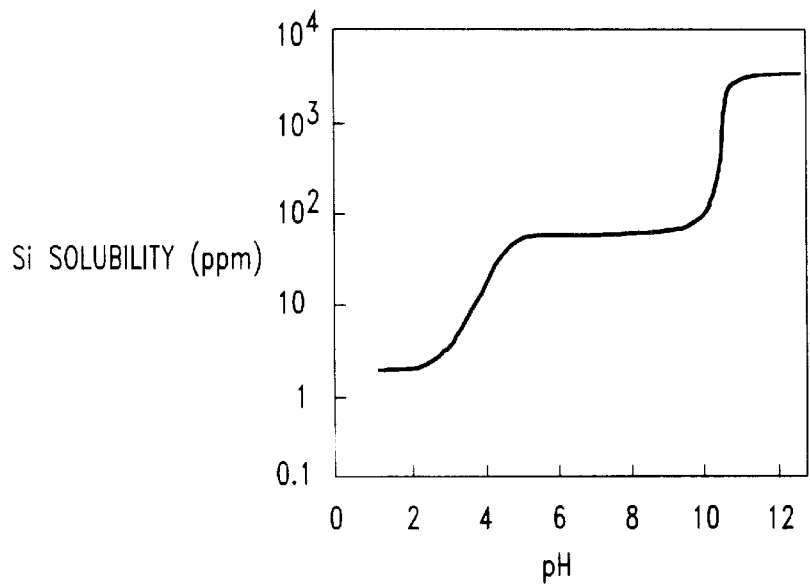
FIG. 1 illustrates the solubility of silica vs. pH for a TMAH-stabilized silica dispersion.

According to one embodiment of the invention, an aqueous stabilized silica dispersion, or sol, is provided. The dispersion typically contains about 30 to about 75 wt. % silica, advantageously about 40 to about 65 wt. % silica, with the surface area of the silica generally ranging from 5 to 100 $m^2/g$. The dispersion is stabilized by conventional methods, typically at a pH greater than 11. Stabilization is generally provided by adding TMAH, typically up to about 3 wt. %, although other organic bases, including other tetraalkylammonium hydroxides, are also suitable. The dispersion is typically aged for at least 18 hours, more typically at least 24 hours, to adequately dissolve the silica, and then optionally centrifuged to remove contaminants. The isoelectric point (IEP) of the silica is then adjusted to about 9.0 (advantageously 10.0) or greater by addition of an IEP-modifying compound, such that the gel point is about 10.5 or greater, advantageously 10.8 or greater. The IEP-modifying compound is typically selected from ammonium hydroxide, primary amines, secondary amines, tertiary amines, or compounds containing a combination of primary, secondary, and/or tertiary amines (examples of the latter combination including N,N'-bis(2-aminoethyl) piperazine and N,N'-bis-(3-aminopropyl) piperazine). Examples of useful compounds within this group include diethylenetriamine, hexamethylenediamine, and tris(2-aminoethyl)amine. The amount of IEP-modifying compound added depends on the compound's particular effect. A small amount of some compounds has an effect equivalent to several times more of another compound. In addition, the properties of the gel depend largely on the particular IEP-modifying compound used. Selection of the IEP-modifying compound also depends on whether one desires to cast or extrude the resultant gel. Use of such compounds to adjust IEP is discussed in U.S. patent application Ser. No. 09/089,859 (our reference Chen 1-1-10), the disclosure of which is hereby incorporated by reference. The dispersion is stabilized, and IEP adjusted, such that the pH of the dispersion is greater than the gel point.

A gelling agent is subsequently added to drop the pH of the dispersion to the gel point, which is typically about 1 to 2 pH units above the IEP, as discussed above. Generally, up to about 5 wt. % of the gelling agent is suitable, based on the weight of the dispersion. The gelling agent is typically a water-soluble liquid that undergoes hydrolysis to consume base, e.g., an ester, amide, or an alkyl halide, and thereby lowers the pH. Advantageously, the pH is maintained at about 10.5 or higher, advantageously 10.8 or higher throughout gelation. There are two basic ways to maintain such a pH. First, the amount of gelling agent is selected such that the agent does not cause the pH to fall below a desired value. Second, it is possible to use a gelling agent that provides a buffering mechanism to maintain the pH of the dispersion at a desired value or higher. For example, formamide consumes hydroxide ions, but liberates an amine base (ammonia). By contrast, an equivalent amount of an ester would not generate such a base, and would be expected to lower the pH much further than a buffering gelling agent. Other gelling agents which have been found to be useful, some of which are presented in the Examples, include N-(2-hydroxyethyl) trichloroacetamide, N-(2-hydroxyethyl) trifluoroacetamide, N,N'-[di(2-hydroxyethyl)] trifluoroacetamide, 1-chloro-2-propanol, glyceryl monoisobutyrate, methyl 2-hydroxyisobutyrate, ethyl 2-hydroxyisobutyrate, methyl isobutyrate, N-(2-hydroxyethyl) succinimide, 2-hydroxyethyl methacrylate, 2-hydroxypropyl methacrylate, and ethyl lactate, methyl acetate, and propylene carbonate.

After adding the gelling agent, the dispersion is typically transferred into a mold or an extruder, where it is allowed to gel. Gelling typically occurs over a time period of about 15 minutes to about 20 hours. Where the gel body is molded, the gel is then typically allowed to age in the mold for about 5 to 30 hours. For extrusion, the gel generally ages for a few hours or less. Aging provides a desirable rearrangement of particles, leading to better packing, expulsion of some liquid around the particles, and associated shrinkage of the gel in the mold—a process known as syneresis. Syneresis adds strength and, due to the shrinkage, eases removal from a mold. Once aged, the gel is released from the mold, or extruded into the desired shape. The gel is then dried, typically under relatively moderate conditions, e.g., temperature less than 25° C. and relative humidity greater than 50%, until about 10 wt. % loss of water, based on the weight of the pre-dried gel body. After this relatively small water loss, the gel body advantageously exhibits an ultimate strength of at least 20 MPa. Once the strength of the body increases to these levels, it is possible to accelerate drying by increasing temperature (e.g., 25 to 100° C.) and lowering humidity (e.g., 30 to 50% relative humidity). The body is then typically heated to remove organics and purify the material, and then sintered to glass.

Figure 2A:
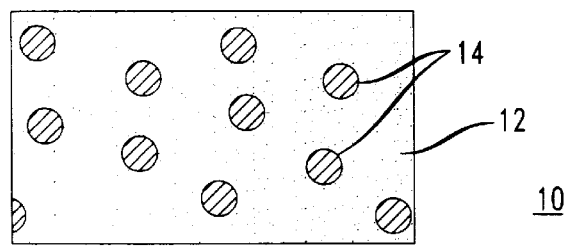
FIGS. 2A–2C illustrate a contemplated mechanism for formation of the strong gel body of the invention.
Figure 2B:
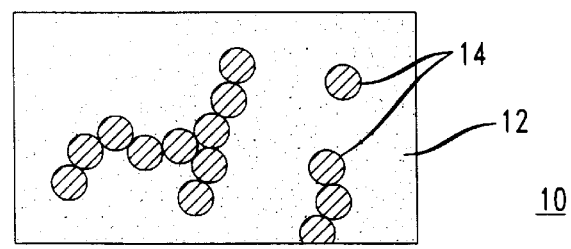
Figure 2C:
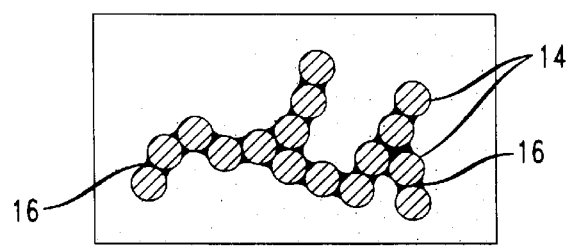
Figure 3:
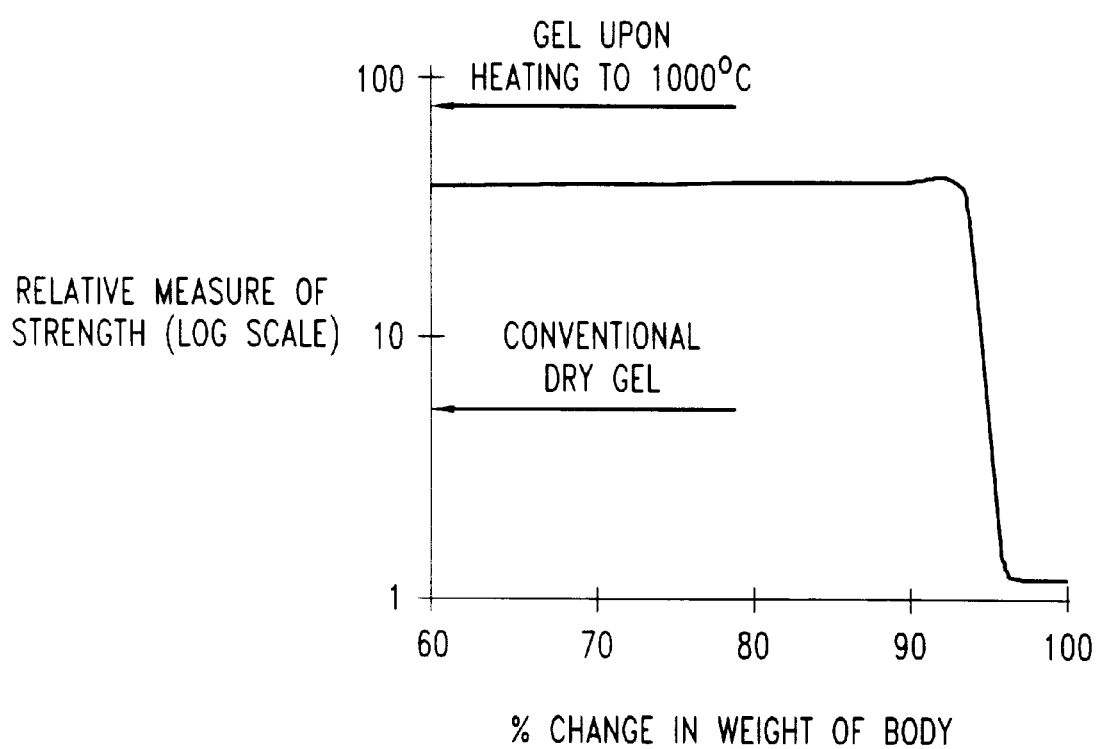
FIG. 3 illustrates the relative increase in strength as a function of weight (i.e., water) loss for a gel body formed according to the invention.

The above described process allows for formation of neck regions between silica particles, these regions creating a strong network that provides the strength discussed previously. While not limiting the invention to any theory, it is believed that the mechanism by which the network is formed is as follows. The solubility of silica in an aqueous solution stabilized with TMAH or a similar organic base as a function of pH is shown in FIG. 1. The solubility hits a plateau of relatively high solubility above a pH of about 10.5, more clearly above 10.8 (referred to herein as the high-solubility plateau), and the solubility drops sharply (from greater than $10^3$ ppm to less than $10^2$ ppm) from about 10.8 to about 10. On this high-solubility plateau, as reflected in FIG. 2A, the silica dispersion 10 typically contains silica in solution phase (as a silicate 12, e.g., $(TMA)_2SiO_3$ where the stabilizing agent is TMAH), along with silica particles 14. The dispersion advantageously contains at least about 500 ppm, typically about 500 to about 3000 ppm, of dissolved silica, such that is it possible to reach the high solubility plateau. This level of dissolved silica is typically attained by aging a silica dispersion for at least 18 hours, more typically at least 24 hours. Alternatively, it is possible to add tetramethylammonium silicate to a TMAH-stabilized silica dispersion. Normally, the IEP of such a TMAH-stabilized silica dispersion is about 6 to 7 depending on the TMAH concentration (and the gel point is therefore about 8 to 9). Such an IEP does not allow one to induce gelation while the dispersion is on the high-solubility plateau. The use of an IEP-modifying compound, however, pushes the IEP of the dispersion up to about 9.0 or higher, advantageously 10.0 or higher, such that the gelation point is on the high-solubility plateau. Gelation and drying are advantageously induced at or near the high-solubility plateau. While a pH of about 10.5 will typically reach the edge of the plateau, a pH of at least 10.8 is advantageously used to increase the benefits of the above-described mechanism. In one embodiment, a gelling agent is added to the dispersion to bring the pH down to the gel point. As reflected in FIG. 2B, at and near the gel point, the mutual repulsion of the silica particles 14 lessens, and the particles 14 begin to gel. However, because the IEP was adjusted to a high enough pH value to move the gel point to the high-solubility plateau, the silica 12 remains in solution during gelation. By keeping the pH of the gel on this plateau, it is believed the silica in solution 12 is able to controllably precipitate at the point of contact of adjacent silica particles 14, since such sites are the minimum free energy sites for precipitation. Neck regions 16 between particles 14 are thereby formed, as reflected in FIG. 2C, resulting in the desirable strength of the gel body. The precipitation appears to occur primarily at the onset of drying, as reflected in FIG. 3 which illustrates generally the increase in relative strength of a gel body as a function of weight loss, i.e., water loss. A sharp increase is seen over about 4 to about 10 wt. % water loss. It is believed that the removal of water upon drying supersaturates the silicate, such that the silicate precipitates as discussed above.

Alternatively, instead of a gelling agent that reduces pH, it is possible to use an alkali metal salt that screens (e.g., reduces) the double layer of the silica particles and thereby induces the same mechanism. Specifically, the added salt reduces the charge contained within the double layer and thereby reduces the neutrality, and thus the mutual repulsion, of the particles. The particles thereby come in contact with each other, i.e., begin gelation, and the silicate precipitates at the contact points, as discussed above. However, use of salts is disadvantageous for some applications. Specifically, gels formed by use of salts typically do not exhibit syneresis, and removal of the body from the mold is therefore inhibited. Moreover, use of salts such as NaCl is undesirable because sodium must be removed prior to sintering. In addition, ammonium salts of weak acids, such as ammonium formate or ammonium citrate tend to cause inhomogeneous gelation.

For relatively small silica particles (e.g., >200 $m^2/g$), formation of neck regions and associated strengthening appears to occur, at least partially, without the need for drying. Specifically, particles of such small size appear to undergo substantial ripening, i.e., the particles will come out of solution at the contact points of adjacent silica particles prior to drying. It is possible to use a combination of ripening and drying to obtain desired properties for bodies formed from such small silica particles.

The process is useful for fabricating overcladding tubes for optical fiber preforms, as discussed, for example, in U.S. Pat. No. 5,240,488, referenced previously (except for the '488 patent's use of glycerin and the polymer additive, as discussed above), as well as substrate tubes. To obtain a finished is preform, the overcladding tube is typically placed over a core rod, and the components are heated and collapsed into a solid, consolidated preform, as discussed in U.S. Pat. No. 4,775,401, the disclosure of which is hereby incorporated by reference. The core rod is fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816, the disclosures of which are hereby incorporated by reference. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material.

The invention will be further clarified by the following examples, which are intended to be exemplary.

EXAMPLE 1

A silica dispersion was provided containing 55 wt. % silica (having a surface area of about 50 $m^2/g$) and about 1.5 wt. % TMAH, based on the weight of the dispersion. The dispersion was aged for about 18 to about 24 hours. The pH of the TMAH-stabilized dispersion was about 11.5. Tris(2-aminoethyl)amine (STAR) was mixed with the dispersion, in an amount of 0.5 wt. % based on the weight of the dispersion, to raise the IEP, resulting in a pH of about 12.2. Subsequently, 3.5 wt. %, based on the weight of the dispersion, of formamide was added as a gelling agent. Gelation in a mold having a diameter of about 100 mm and a length of about 100 cm was completed in about 12 hours at about 23° C., and the pH during gelation stayed above 10.8. Onset of gelation was indicated by inability of the mixture to be poured. The gel was then aged for greater than about 18 hours. Bodies were removed from molds and dried at about 24° C. and about 55% relative humidity for about 24 hours. Strength was examined over time by breaking a portion of a body and observing the qualitative increase in the force required over time. Heating to remove organics and other impurities was performed, followed by sintering to a glass body.

EXAMPLE 2

A silica dispersion was provided containing 55 wt. % silica (having a surface area of about 50 $m^2/g$) and about 1.5 wt. % TMAH, based on the weight of the dispersion. The pH of the TMAH-stabilized dispersion was about 11.5. STAR was mixed with the dispersion, in an amount of 0.5 wt. %, based on the weight of the dispersion, to raise the IEP, resulting in a pH of about 12.2. Subsequently, 3.0 wt. %, based on the weight of the dispersion, of N-(2-hydroxyethyl) trichloro-acetamide was added as a gelling agent. Gelation in a mold of the same dimensions as in Example 1 was completed in about 3 hours at about 23° C., and the pH during gelation stayed above 10.8. Onset of gelation was again indicated by the inability to pour the mixture. The gel was then aged for greater than about 18 hours. Bodies were removed from molds and dried at about 24° C. and about 55% relative humidity for about 24 hours. Strength was examined over time by breaking a portion of a body and observing the qualitative increase in the force required over time. Heating was performed to remove organics and other impurities, followed by sintering to a glass body.

EXAMPLE 3

A variety of compounds were tested for their use as gelling agents under the following process conditions by determining if a gel rod formed in a mold of the same dimensions as the previous examples was capable of being formed such that the rod would support its own weight upon release from the mold. 100 g of a silica dispersion was provided containing 50–55 wt. % silica (having a surface area of about 50 $m^2/g$), based on the weight of the dispersion, and having 0.014 M TMAH. The pH of the TMAH-stabilized dispersion was about 11.5. Tris(2-aminoethyl)amine, 0.5 g, was mixed with the dispersion to raise the IEP, resulting in a pH of about 12.2. Subsequently, a gelling agent was added, to a level of 0.012 M. The mixture was then placed in the mold and allowed to gel at room temperature (unless otherwise indicated) for the indicated time, as reflected in Tables 1 and 2. The gelling agents of Table 1 produced tubes capable of supporting their own weight after gelation for the indicated time at room temperature, whereas the compounds of Table 2 did not produce tubes capable of doing so. (Note that the results of this Example are specific to the particular cast body, and do not indicate that the compounds of Table 2 are unsuitable for all sol-gel processes.)

TABLE 1

Successful gelling agents (for the embodiment of Ex. 3)

| Compound | Time |
| --- | --- |
| N-(2-hydroxyethyl) trichloroacetamide | 5 hours |
| N-(2-hydroxyethyl) trifluoroacetamide | 40 minutes |
| N,N-[di(2-hydroxyethyl)] trifluoroacetamide | 40 minutes |
| 1-chloro-2-propanol | <2 hours |
| glyceryl monoisobutyrate | 4 hours |
| methyl 2-hydroxyisobutyrate | 30 minutes |
| ethyl 2-hydroxyisobutyrate | 2.7 hours |
| methyl isobutyrate | 4 hours |
| N-(2-hydroxyethyl) succinimide | <2 hours |
| 2-hydroxyethyl methacrylate | about 2 hours |

TABLE 2

Unsuccessful gelling agents (for the embodiment of Ex. 3)

| Compound | Time |
| --- | --- |
| N,N'-di(2-hydroxyethyl oxamide) | many days |
| glyceryl monopivalate | many days (45° C.) |
| nitromethane | instantaneous |
| 2,2-dichloroethanol | many days (45° C.) |
| 2-oxazolidinone | many days |
| 2-hydroxypropyl acetate | few minutes |
| 2-hydroxyethyl cyanoacetamide | many days |
| acetol | many days |
| pyruvic aldehyde | many days |
| ethyl isobutyrate | >20 hours |

EXAMPLE 4

A dispersion containing 50 wt. % silica (50 $m^2/g$) was stabilized with 1.5 wt. % TMAH and aged for about 24 hours. Tris(2-aminoethyl)amine (STAR), 0.8 wt. %, was added, followed by 1.58 wt. % ethyl 2-hydroxyisobutyrate to induce gelation. The mixture was placed in a mold having the same dimensions as in the previous examples. The sample gelled in about 2.7 hours and the pH at which gelation occurred was about 11.2. The gel was aged for about 18 hours, after which the pH was about 10.8. After aging, the gel had experienced some slight shrinkage by the process of syneresis, which allowed easy release from the mold. The gel body was placed in an oven and dried at about 25° C. and 50% humidity until about 5% reduction in weight, and was then amenable to more rapid drying by gradually increasing the temperature up to at least 90° C. without cracking.

EXAMPLE 5

A dispersion containing 50 wt. % silica (50 $m^2/g$) was stabilized with 1.5 wt. % TMAH and aged for about 24 hours. STAR was added, 0.8 wt. %, followed by 2 wt. % formamide to induce gelation. The mixture was placed in a mold having the same dimensions as the previous examples. The sample gelled in about 10 hours and the pH at which gelation occurred was about 11.2. The gel was aged for about 18 hours, after which the pH was about 11.0. After aging, the gel had experienced some slight shrinkage by the process of syneresis, which allowed easy release from the mold. The gel body was placed in an oven and dried at about 25° C. and 50% humidity until about 5% reduction in weight, and was then amenable to more rapid drying by gradually increasing the temperature up to at least 90° C. without cracking.

EXAMPLE 6

A dispersion containing 50 wt. % silica (50 $m^2/g$) was stabilized with 1.5 wt. % TMAH and aged for about 24 hours. STAR was added, 0.8 wt. %, followed by 1.2 wt. % 1-chloro-2-propanol to induce gelation. The mixture was placed in a mold having the same dimensions as the previous examples. The sample gelled in about 2 hours and the pH at which gelation occurred was about 11.2. The gel was aged for about 18 hours, after which the pH was about 10.8. After aging, the gel had experienced some slight shrinkage by the process of syneresis, which allowed easy release from the mold. The gel body was placed in an oven and dried at about 25° C. and 50% humidity until about 5% reduction in weight, and was then amenable to more rapid drying by gradually increasing the temperature up to at least 90° C. without cracking.

EXAMPLE 7

A dispersion containing 50 wt. % silica (50 $m^2/g$) was stabilized with 1.5 wt. % TMAH and aged for about 24 hours. STAR was added, 0.8 wt. %, followed by 2.5 wt. % 1-chloro-2-propanol to induce gelation. The mixture was placed in a mold having the same dimensions as in the previous examples. The sample gelled in about 1.3 hours and the pH at which gelation occurred was about 11.2. The gel was aged for about 18 hours, after which the pH was about 9. After aging, the gel had experienced some slight shrinkage by the process of syneresis, which allowed easy release from the mold. The gel body 15 was placed in an oven and dried at about 25° C. and 50% humidity until about 5% reduction in weight, and was then amenable to more rapid drying by gradually increasing the temperature up to at least 90° C. without cracking.

EXAMPLE 8

A dispersion containing 50 wt. % silica (50 $m^2/g$) was stabilized with 1.5 wt. % TMAH and aged for about 24 hours. STAR was added, 0.8 wt. %, followed by 1.2 wt. % 1-chloro-2-propanol to induce gelation. The mixture was placed in a mold having the same dimensions as the previous examples. The sample gelled in about 2 hours and the pH at which gelation occurred was about 11.2. The gel was aged for more than 250 hours, after which the pH was about 10.8. After aging, the gel had experienced some slight shrinkage by the process of syneresis, which allowed easy release from the mold (as in Example 6). The wet gel strength (with no drying) was not measurably different from the wet gel strength after 18 hours of aging in Example 6. The gel body was placed in an oven and dried at about 25° C. and 50% humidity until about 5% reduction in weight, and was then amenable to more rapid drying by gradually increasing the temperature up to at least 90° C. without cracking.

EXAMPLE 9

The process of Example 8 was performed, but with a finer silica having a surface area of 200 $m^2/g$. The gel showed a marked increase in wet strength after the prolonged aging.

EXAMPLE 10

A dispersion containing 50 wt. % silica (50 $m^2/g$) was stabilized with 1.5 wt. % TMAH and aged for about 24 hours. N,N'bis-3-aminopropyl piperazine, 1.6 wt. %, was added, followed by 1.2 wt. % methyl 2-hydroxyisobutyrate to induce gelation. The mixture was placed in a mold having the same dimensions as in the previous examples. The sample gelled in about 28 hours and the pH at which gelation occurred was about 10.5. The gel was aged for more than 24 hours. After aging, the gel showed a low yield strength (putty-like properties), and was not amenable to removal from the mold.

EXAMPLE 11

A dispersion containing 50 wt. % silica (50 $m^2/g$) was stabilized with 1.5 wt. % TMAH and aged for about 24 hours. NaCl, 1.5 wt. %, and 1.25 wt. % tetramethylammonium chloride were added to induce gelation by screening of the double layer. The mixture was placed in a mold having the same dimensions as in the previous example. The sample gelled in about 6 hours and the pH at which gelation occurred was about 10.9. The gel was aged for about 18 hours, after which the pH was about 10.9. The gel did not exhibit syneresis, and removal from the mold was therefore inhibited. The gel body was placed in an oven and dried at about 25° C. and 50% humidity until about 5% reduction in weight, and was then amenable to more rapid drying by gradually increasing the temperature up to at least 90° C. without cracking.

Other embodiments of the invention will be apparent to those skilled in the art from consideration of the specification and practice of the invention disclosed herein.

What is claimed is:

1. A process for fabricating a silica body, comprising the steps of:

adding to a silica dispersion a tetraalkylammonium hydroxide stabilizing agent and allowing the dispersion to age, wherein the amount of tetraalkylammonium hydroxide and the time of aging is sufficient to attain at least 500 ppm of dissolved silica in the dispersion;

adjusting the isoelectric point of the silica to about 9.0 or higher by adding a compound selected from ammonium hydroxide, a primary amine, a secondary amine, a tertiary amine, and a compound comprising any combination of primary amines, secondary amines, or tertiary amines;

inducing, at a pH of about 10.5 or greater, gelation of the dispersion into a gel body; and drying the gel body to remove water.

2. The process of claim 1, wherein the gel body exhibits an ultimate strength of at least 20 MPa at a water loss of about 10 wt. %.

3. The process of claim 1, wherein gelation is induced by adding a gelling agent to the silica dispersion, the gelling agent lowering the pH of the dispersion to the gel point.

4. The process of claim 3, wherein the pH of the dispersion prior to inducing gelation is about 11 or higher.

5. The process of claim 1, wherein gelation is induced at a pH of 10.8 or higher.

6. The process of claim 3, wherein the pH remains at about 10.5 or higher until at least the onset of drying.

7. The process of claim 1, wherein the compound comprises tris(2-aminoethyl)amine.

8. The process of claim 3, wherein the gelling agent is selected from formamide, N-(2-hydroxyethyl) trichloroacetamide, N-(2-hydroxyethyl) trifluoroacetamide, N,N'-trifluoroacetamide, 1-chloro-2-propanol, glyceryl monoisobutyrate, methyl 2-hydroxyisobutyrate, ethyl 2-hydroxyisobutyrate, methyl isobutyrate, N-(2-hydroxyethyl) succinimide, 2-hydroxyethyl methacrylate, 2-hydroxypropyl methacrylate, ethyl lactate, methyl acetate, and propylene carbonate.

9. The process of claim 1, wherein the stabilizing agent is selected from tetramethylammonium hydroxide and tetraethylammonium hydroxide.

10. The process of claim 1, wherein gelation is induced by aging the dispersion at a pH of about 10.5 or higher.

11. The process of claim 1, wherein, upon at least the onset of drying, neck regions form between silica particles.

12. The process of claim 1, wherein the silica body is at least 1 kilogram.

13. The process of claim 1, wherein the silica dispersion comprises about 40 to about 65 wt. % silica.

14. The process of claim 1, wherein the silica body is an optical fiber preform.

* * * * *